United States Patent [19]

Kimbrough et al.

[11] Patent Number: 4,931,597
[45] Date of Patent: Jun. 5, 1990

[54] JUNCTION BOXES

[75] Inventors: Robert L. Kimbrough, Oxford, Ohio; Donald L. Chapman, Liberty, Ind.

[73] Assignee: Square D Company, Palatine, Ill.

[21] Appl. No.: 283,424

[22] Filed: Dec. 12, 1988

[51] Int. Cl.$^5$ .............................................. H02G 3/08
[52] U.S. Cl. ........................................ 174/48; 174/57
[58] Field of Search ............... 174/48, 49, 57; 52/221; 220/3.7

[56] References Cited

U.S. PATENT DOCUMENTS

| Re. 28,035 | 6/1974 | Fork | 174/49 |
|---|---|---|---|
| 2,063,569 | 12/1936 | Walker | 247/19 |
| 2,929,529 | 3/1960 | Hudson | 220/3.4 |
| 2,930,504 | 3/1960 | Hudson | 220/3.4 |
| 2,937,227 | 5/1960 | Selnau | 174/84 |
| 3,053,014 | 9/1962 | Fork | 50/127 |
| 3,061,663 | 10/1962 | Reiland | 174/49 |
| 3,318,476 | 5/1967 | Clark | 220/3.4 |
| 3,338,450 | 8/1967 | Rose | 220/3.94 |
| 3,405,834 | 10/1968 | Butler et al. | 220/3.4 |
| 3,499,570 | 3/1970 | Butler | 220/3.3 |
| 3,530,627 | 9/1970 | Carter et al. | 52/221 |
| 3,784,042 | 1/1974 | Hadfield et al. | 220/3.3 |
| 3,885,852 | 5/1975 | Grove | 339/95 D |
| 3,902,002 | 8/1975 | Smith | 174/51 |
| 4,306,109 | 12/1981 | Nattel | 174/51 |
| 4,443,654 | 4/1984 | Flachbarth et al. | 174/48 |
| 4,465,897 | 8/1984 | Albrecht | 174/48 |
| 4,591,656 | 5/1986 | Mohr | 174/48 |

OTHER PUBLICATIONS

Exhibit A—A Catalog Entitled "Underfloor Duct" published Jul. 1983, by Square D Company.
Exhibit B—Square D Company Digest No. 167, pp. 160-161, Mar. 1988.
Exhibit C—A Drawing of a Typical Tunnel Divider Utilized with Square D Company's CELL-DUCT Product.
Exhibit D—Catalog WD 483R Entitled "Walkerduct ® Underfloor Distribution Systems" published by Walker, A Division of Butler Mfg. Co., Parkersburg, W. Va.
Exhibit E—Brochure No. WC784R Titled "Walkercell TM Cellular Raceway System for Reinforced Concrete Construction" published by Walker, A Division of Butler Manufacturing Company, Parkersburg, West Virginia.

*Primary Examiner*—Leo P. Picard
*Assistant Examiner*—David A. Tone
*Attorney, Agent, or Firm*—Larry I. Golden; Jose W. Jimenez; James E. Lowe, Jr.

[57] ABSTRACT

A junction box apparatus for an electrical raceway system to be placed in a floor includes a base and a removable access unit. A removable tunnel insert is provided which can be inserted down through the access unit after the access unit is mounted upon the base. The tunnel insert defines a plurality of passages through the junction box. A removable extension collar is also provided which is adapted to be sandwiched between the base and the access unit for determining a nominal height of the junction box apparatus. Also, removable duct separators having spring metal clips with serrated edges are provided which are adapted to be connected to the base for separating a plurality of ducts received in the duct openings. By a combination of the removable tunnel insert, the removable extension collar, and the removable duct separators, a basic base and access unit assembly can be readily modified to be compatible with a plurality of duct combinations and arrangements and a plurality of floor thicknesses.

26 Claims, 6 Drawing Sheets

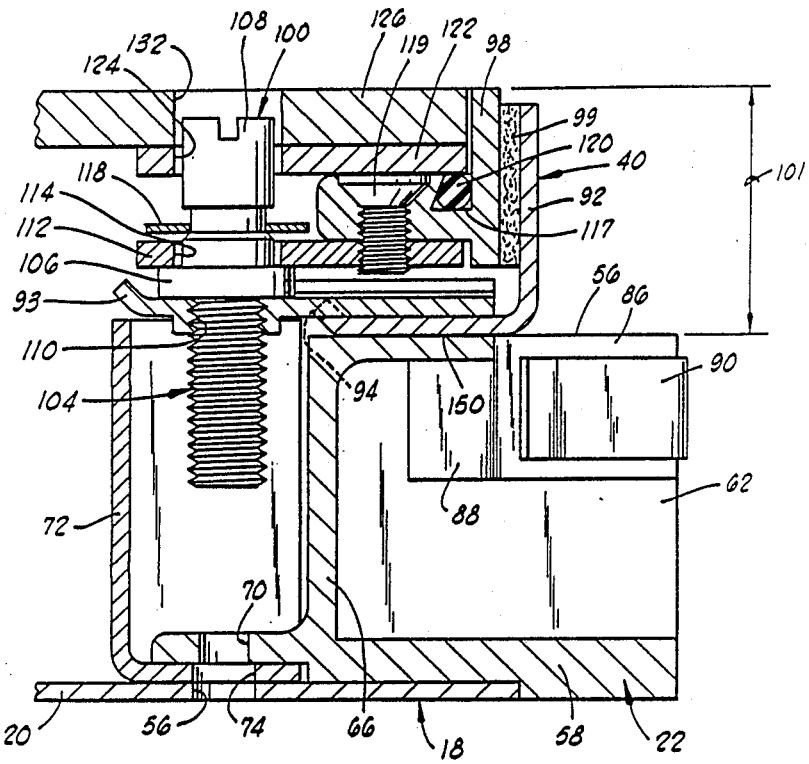
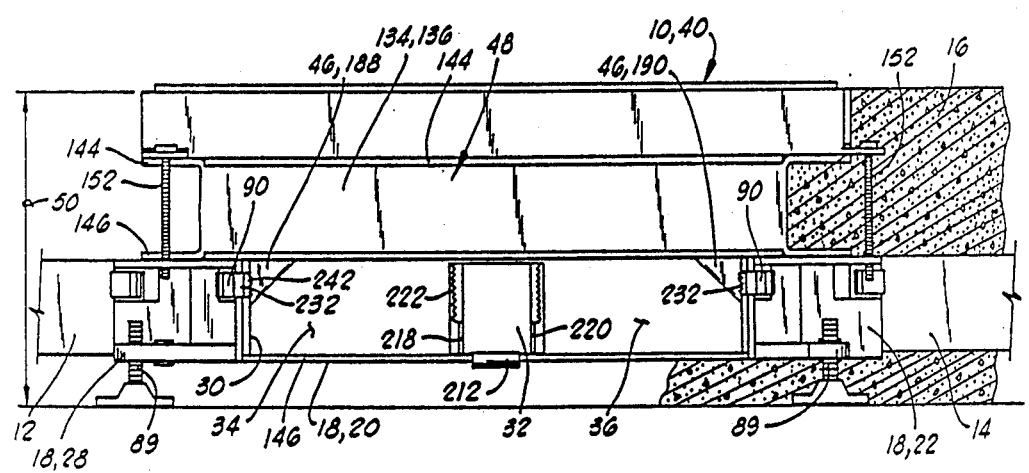

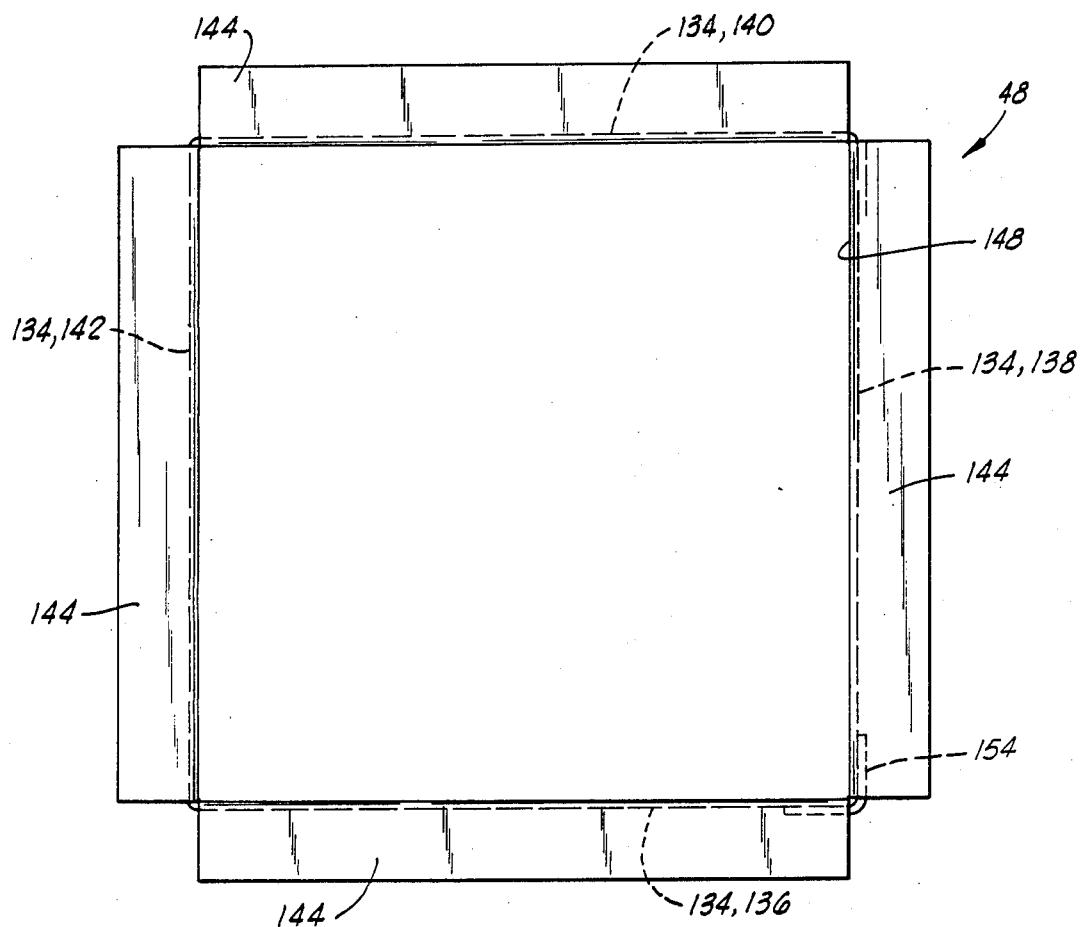
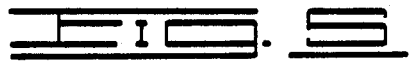
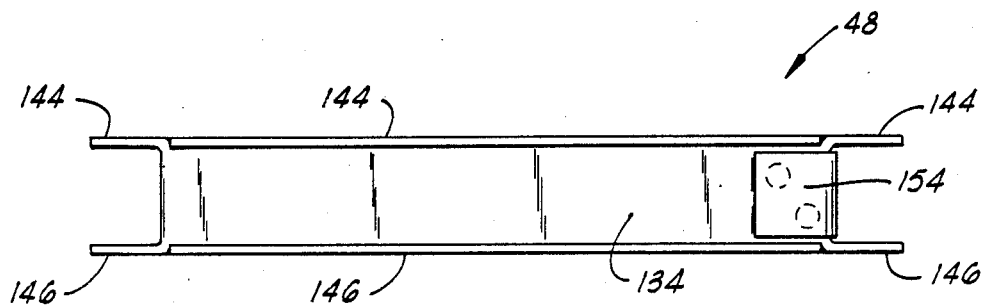
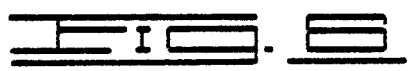

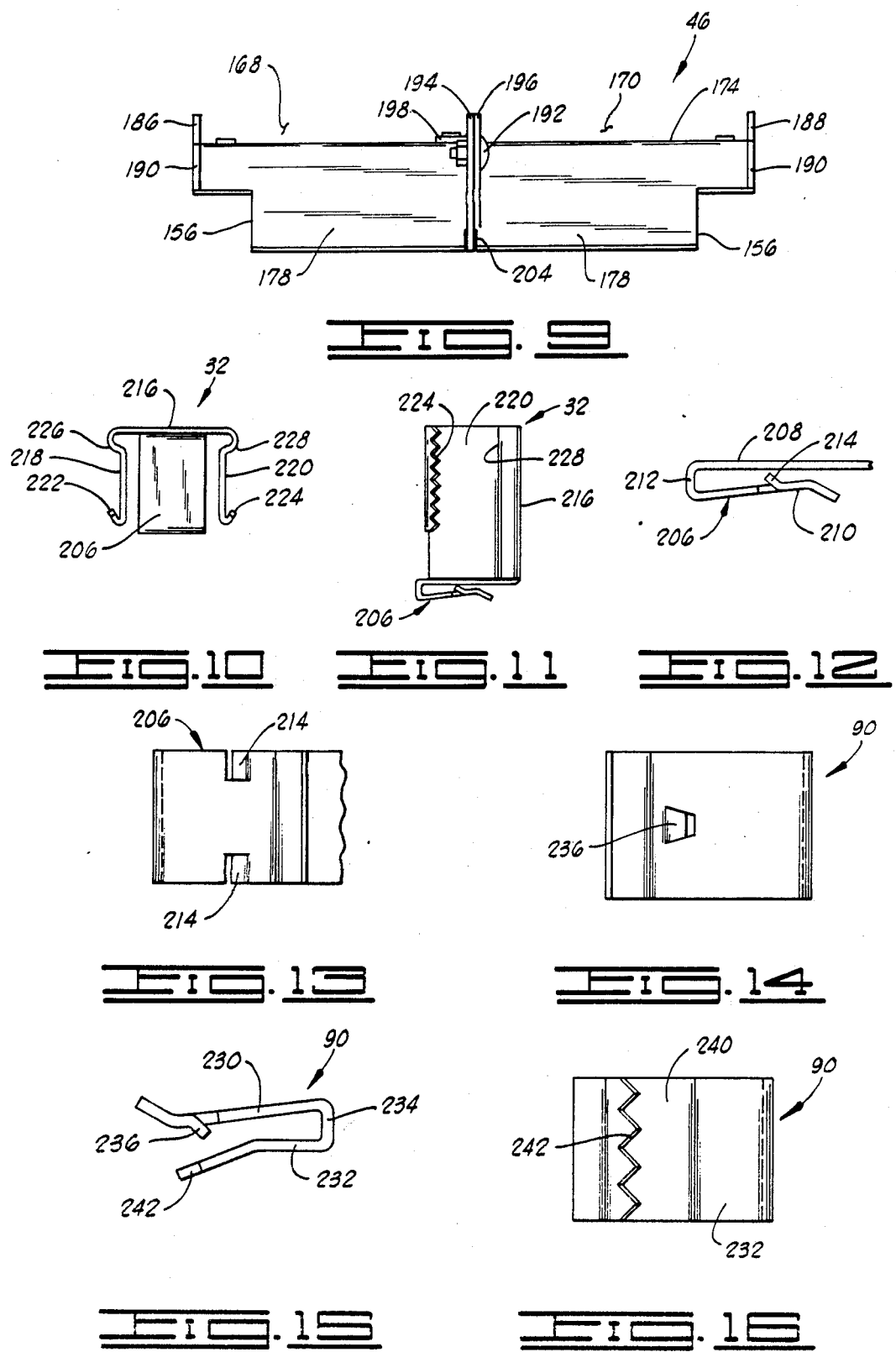

JUNCTION BOXES

This invention relates generally to junction boxes for use with an electrical raceway system designed to be placed in a floor, and more particularly, but not by way of limitation, to a junction box assembly which is readily adaptable for use with a variety of duct patterns and a variety of floor thicknesses.

BACKGROUND OF THE INVENTION

There are several well known types of electrical raceway systems which are designed to be placed in a floor. There are for example "underfloor raceways" as defined in Article 354 of the National Electrical Code and "cellular metal floor raceways" as defined in Article 356 of the National Electrical Code. Junction boxes designed for use in either of these two mentioned raceway systems, and conceivably in some other systems, can generally be referred to as junction boxes for use with a raceway system designed for placement in a floor.

As used herein the simple term "duct" or "raceway", or the phrase "raceway system for placement in a floor", or the like are intended to refer in a generic sense to an "underfloor raceway" or to a "cellular metal floor raceway" or both. Where the term "underfloor duct" or "underfloor raceway" is used it is intended as a reference to the particular type of system defined in Article 354 of the National Electrical Code.

The junction box disclosed in this application is designed primarily for use with an underfloor duct for use as part of an underfloor raceway, and is referred to as such in the description contained herein. It can, however, be used as part of a cellular metal floor raceway system and thus is generally referred to as a junction box for an electrical raceway system to be placed in a floor.

Underfloor duct is an electrical raceway system designed to be imbedded in the concrete floor of offices, classrooms, laboratories, manufacturing areas, supermarkets, etc., for the purpose of providing an enclosed raceway for wires and cables from their originating panel to their point of use.

Such an underfloor raceway system includes two types of ducts, namely feeder ducts and distribution ducts. Complementing these two types of ducts are junction boxes, support couplers and supports, horizontal and vertical elbows, power and telephone outlets and numerous cast and sheet metal fittings such as conduit adapters, change of direction duct runs, "Y" take-offs, etc.

A typical example of such an underfloor duct system, and particularly of a junction box for use therewith, is shown in U.S. Pat. No. 3,405,834 to Butler, et al., and assigned to the assignee of the present invention.

There are a number of disadvantages with a junction box structure like that of Butler, et al.

For example, the tunnel dividers which have previously been utilized with these junction boxes are factory installed, and cannot be removed without disassembly of the junction box. In order to provide a plurality of arrangements of ducts, the Butler, et al. design requires a separate model of junction box for each different duct arrangement, and thus a great many different junction boxes must be stocked by suppliers.

The duct separators utilized in junction boxes like that of Butler, et al., are also provided from the factory and give the customer little or no flexibility in changing the duct arrangement. Junction boxes that have been designed with removable separators require a special tool for this purpose and are labor intensive for the user.

Grounding of the ducts to a junction box like that of Butler et al. is accomplished with separate ground screws which must be screwed into engagement with the duct after the duct is inserted into the junction box.

Additionally, the junction box like that of the Butler, et al. patent provides no accommodation for different concrete floor depths. In order to provide for the different concrete floor depths that may be called for by an architect, these junction boxes have been supplied in various heights, so that for each different duct arrangement there must be a plurality of special junction boxes to provide for the different concrete floor thicknesses that can be utilized with that duct arrangement.

Although one manufacturer, the Walker division of Butler Manufacturing Company of Parkersburg, W. Va., has provided a junction box that can be modified to adjust its height, field conversion to another ring height of that device is very tedious. First the box cover must be removed. Then the trim ring assembly must be slowly adjusted upward until it is completely free of the adjusting screws. An extension collar is then added to the top side of the pan. New longer screws replace the short ones supporting the trim ring. The trim ring must then be remounted by starting the new longer screws and moving from screw to screw while lowering the trim ring back into the new extension collar. The cover is then replaced. This method is very labor intensive.

Thus it is seen that there is a need for a junction box design which provides a relatively small number of basic junction boxes which can be readily modified in the field to accommodate different duct arrangements and different concrete floor heights. Such a system would be greatly advantageous both economically and technically as compared to presently available systems.

SUMMARY OF THE INVENTION

The present invention provides an improved junction box apparatus which does include a basic junction box structure which can be readily modified in the field to accommodate differing duct arrangements and different concrete heights. This is accomplished through the provision of three main elements, namely a removable tunnel divider, a removable extension collar for changing the height of the junction box, and removable duct separator springs which can be manually assembled with the junction box to accommodate any desired duct arrangement which will fit within the confines of the duct openings of the basic junction box.

Thus, only a relatively few basic junction box sizes must be stocked, along with an assortment of extension collars, tunnel divider inserts, and duct separator springs.

The junction box apparatus of the present invention includes a base having a plurality of duct openings disposed therethrough for receiving a plurality of underfloor ducts with the ducts communicating with an interior of the base.

An access unit is located above and connected to the base for permitting access downward into the interior of the base. This access unit has an access opening defined therethrough.

A removable tunnel insert is located in the interior of the base for defining a plurality of passages communicating the plurality of duct openings. The tunnel insert is constructed and dimensioned so that it can be inserted downward through the access opening of the access unit into place within the interior of the base after the base and access unit are connected together. This may be done after concrete has been poured around the junction box.

A removable extension collar is provided which is adapted to be sandwiched between the base and the access unit. This extension collar determines a nominal height of the junction box apparatus.

Additionally, removable duct separators are provided which are adapted to be connected to the base for separating the ducts received in the duct opening.

By means of the removable tunnel insert, the removable extension collar, and the removable duct separators, one base and access unit can be readily modified to be compatible with a plurality of duct combinations and arrangements, and a plurality of concrete floor thicknesses.

Numerous objects, features and advantages of the present invention will be readily apparent to those skilled in the art upon reviewing the following disclosure when taken in conjunction with the accompanying drawings.

BRIEF DESCRIPTION OF THE DRAWINGS

FIG. 3, is a section view taken along line 3—3 of FIG. 1 showing the details of construction of the trim ring and trim ring adjustment device. Also, certain details of the corner piece and corner clip construction along with a portion of the base plate is shown.

FIG. 4 is an elevation view similar to FIG. 2 after an extension collar has been sandwiched between the base and the access unit. A tunnel insert is in place within the base. A duct separator spring has been installed in the base to separate one of the side openings of the base into two duct openings. Spring clips have been installed on the corner pieces. The right side of the figure shows a concrete floor having been poured around the junction box.

FIG. 5 is a plan view of the extension collar.

FIG. 6 is an elevation view of the extension collar of FIG. 5.

FIG. 9 is a right-side elevation view of the tunnel divider insert of FIG. 7.

FIG. 10 is a plan view of a duct separator spring like that seen in FIG. 4.

FIG. 11 is a right-side elevation view of the duct separator spring of FIG. 10.

FIG. 12 is an enlarged view of the connector clip on the bottom of the duct separator spring of FIG. 11.

FIG. 13 is an enlarged bottom view of the connector clip of the duct separator spring of FIG. 11.

FIG. 14 is a rear elevation view of a corner piece spring clip like that seen in FIG. 4.

FIG. 15 is a plan view of the corner piece spring clip of FIG. 14.

FIG. 16 is a front elevation view of the corner piece spring clip of FIG. 15.

DETAILED DESCRIPTION OF THE PREFERRED EMBODIMENTS

General Description Of The Junction Box

Figure 1:
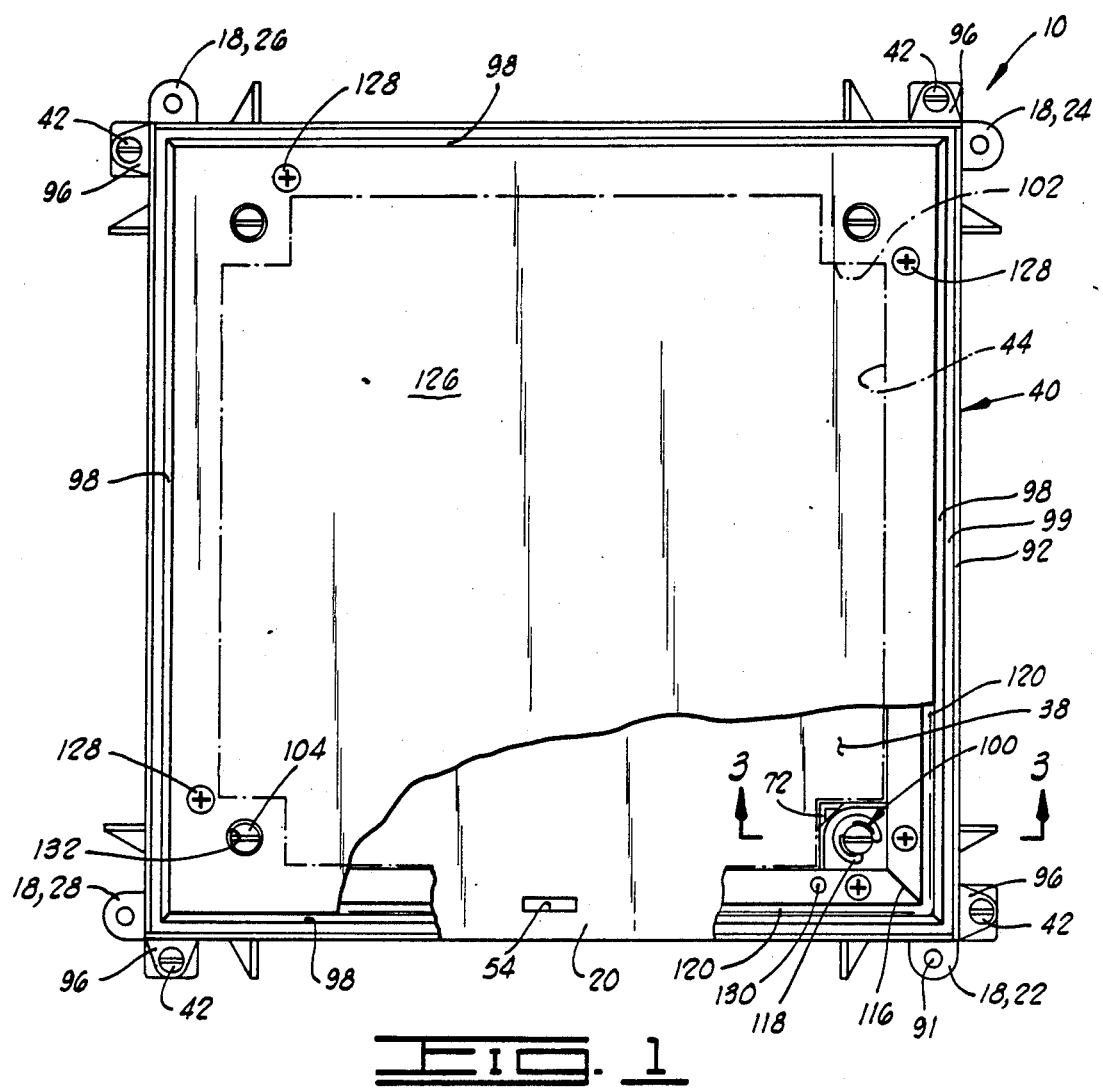
FIG. 1 is a plan view of the assembled base and access unit of the junction box. Portions of the junction box are cut away.

Referring now to the drawings, and particularly to FIGS. 1-4, a junction box apparatus is thereshown and generally designated by the numeral 10. The junction box 10 can generally be referred to as an accessory structure 10 for use with a raceway system to be placed in a floor.

Although the junction box 10 illustrated is a single level junction box, it will be appreciated that the various features of the present invention could also be incorporated in a two-level junction box.

As best seen in FIG. 4, the junction box 10 is constructed for use with a plurality of underfloor ducts such as 12 and 14 of an underfloor duct system which is designed to be imbedded in a poured concrete floor 16.

The junction box 10 includes a base 18 having a base plate 20 and four corner pieces 22, 24, 26 and 28.

As best seen in FIG. 1, the base 18 and the entire junction box 10 are generally rectangular in plan.

Figure 2:
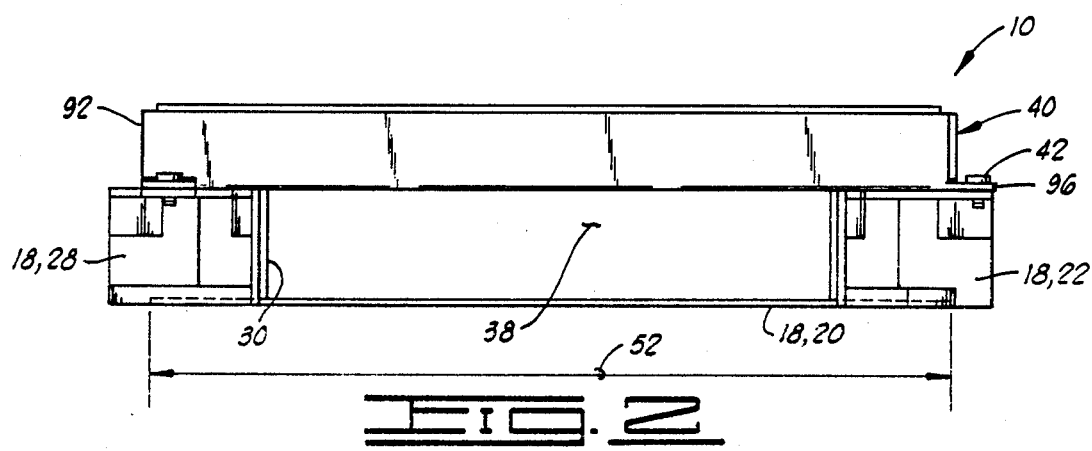
FIG. 2 is an elevation view of the assembly of FIG. 1. It is noted that in FIG. 2, no tunnel divider is shown in place within the base.

On each of the four sides of the base 18 between each of the two corner pieces such as corner pieces 28 and 22 seen in FIG. 2, there is a side opening 30 defined in the base 18. This side opening 30 may be utilized to receive a single duct having substantially the same dimensions as side opening 30 therein, or may be divided to define a plurality of duct openings in that side as is shown in FIG. 4.

In FIG. 4, the side opening 30 has been divided by a duct separator spring 32 into two duct opening means 34 and 36 for receiving underfloor ducts of similar shape therein. Each of the four sides of base 18 has a similar side opening 30 and duct openings 34 and 36.

The base 18 has an interior 38. The duct opening means such as 34 and 36 allow ducts to communicate with the interior 18.

The junction box 10 further includes an access means or access unit 40 located above and connected to the base 18 by four short screws 42. The access unit has an access opening 44 defined therethrough. The access opening 44 is generally outlined in phantom lines in FIG. 1.

Figure 7:
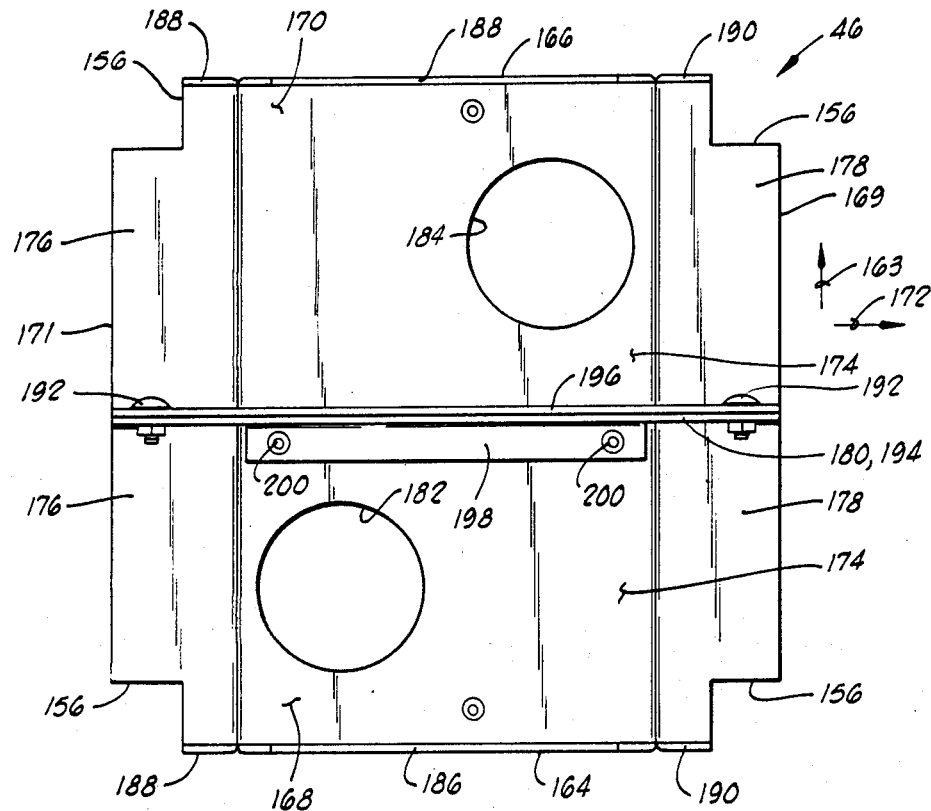
FIG. 7 is a plan view of a tunnel divider insert.

A removable tunnel insert means 46 is located within the interior 38 of base 18. The tunnel insert 46 is best seen in plan view in FIG. 7. The orientation of the plan view of FIG. 7 coincides with the orientation of the plan view of FIG. 1. It is seen in FIG. 7 that the tunnel insert 46 has a plan profile substantially similar to that of the access opening 44 shown in phantom lines in FIG. 1. The outside dimensions of the tunnel insert 46 seen in FIG. 7 are slightly smaller than the dimensions of the access opening 44 so that the tunnel insert 46 may be inserted downward through the access opening 44 into place within the interior 38 of base 18. The tunnel insert 46 provides a means for defining a plurality of passages communicating the various duct opening means defined in the junction box 10 in a manner further described below.

As best seen in FIG. 4, a removable extension collar means 48 is sandwiched between the base 18 and the access unit 40 for determining a nominal height 50 of the junction box apparatus 10.

Details Of The Base And Access Unit

The base 18 and access unit 40 comprise the basic junction box assembly, and are shown isolated from any other components of the junction box 10 in FIGS. 1 and 2. This basic assembly of FIGS. 1 and 2 is preferably provided in several different sizes having different length sides to accommodate differing numbers and arrangements of underfloor ducts. For example, the assignee of the present invention utilizes a smaller duct having a width of 3⅜ inch and a height of 1⅜ inch, and a larger duct having a width of 7¼ inches and a height of 1⅜ inches.

In a typical range of sizes of the basic assembly of FIGS. 1 and 2, the smallest size would have the side openings 30 dimensioned so as to receive a single one of the larger ducts, or two of the smaller ducts separated by a one-inch wide duct separator spring 32. Preferably, three other basic sizes would be provided having sides dimensioned so as to be capable of receiving three, four or five of the smaller 3⅜ inch wide ducts with one-inch duct separator springs 32 located between adjacent ducts. It will be apparent that these larger base and access unit assemblies could also receive one or more of the larger 7¼ inch wide ducts or a combination of 3⅜ wide and 7¼ inch wide ducts. Also even larger ducts are available having widths of 11⅜ inch, 15½ inch and 19⅝ inch which could be utilized with some of the larger base and access unit assemblies.

The general construction of each of the basic assemblies including a base 18 and access unit 40 will be generally similar, regardless of its overall size.

As mentioned, the base 18 includes the base plate 20 and the four corner pieces 22, 24, 26 and 28.

The base plate 20 is a square sheet metal plate having a side dimension 52 as best seen in FIG. 2. The base plate 20 has at least one separator attachment hole 54 (see FIG. 1) defined therethrough on each of its four sides which is utilized to attach the duct separator springs 32.

As best seen in FIG. 3, the base plate 20 also includes rivet holes 56 which are utilized to attach base plate 20 to the corner pieces such as 22.

Figure 17:
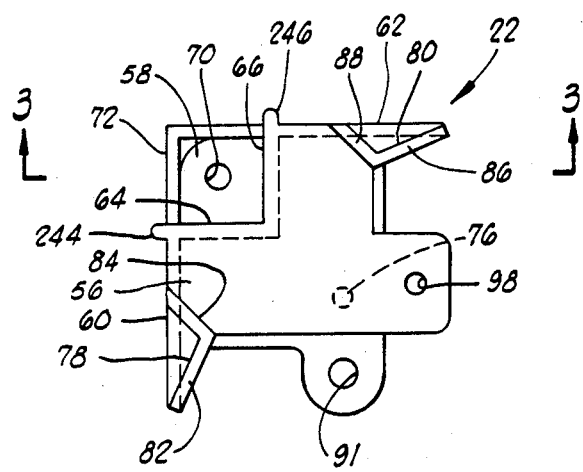
FIG. 17 is a plan view of a corner piece of the base, and is oriented like the lower right-hand corner piece of FIG. 1.
Figures 18, 19:
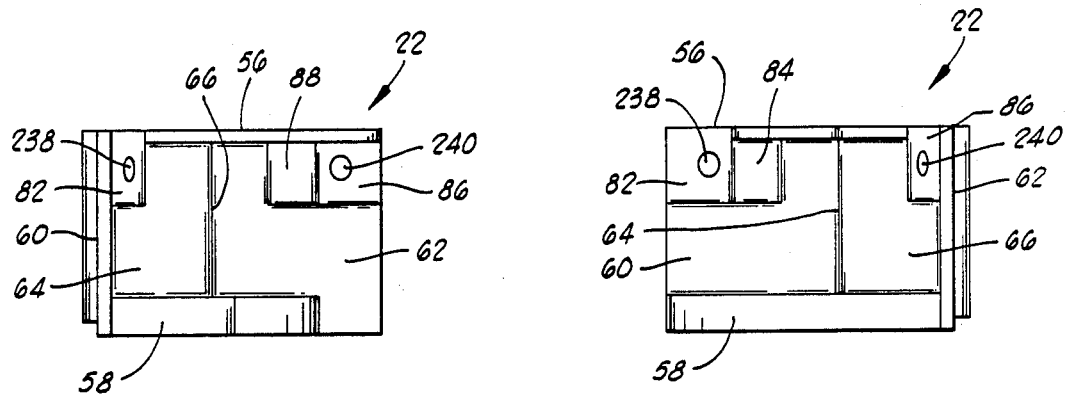
FIG. 18 is a right-side elevation view of the corner piece of FIG. 17.
FIG. 19 is a front-side elevation view of the corner piece of FIG. 17.

The corner piece 22 is best shown in FIGS. 17-19 and one elevation section thereof is provided in FIG. 3.

The corner piece 22 is preferably a casting which is generally comprised of a top wall 56, a bottom wall 58, first and second vertical duct abutment walls 60 and 62, and first and second vertical insert corner walls 64 and 66.

As seen in FIG. 3, the bottom wall 58 of corner piece 22 has a recess 68 defined therein which closely receives a corner of the rectangular base plate 20 so that a rivet hole 70 defined in bottom wall 58 is aligned with the rivet hole 56 of base plate 20. Also apparent in FIG. 3 is a corner filler bracket 72 which also has a rivet hole 74 defined therethrough which is aligned with the rivet holes 56 and 70. A rivet, not shown, is placed through rivet holes 56, 74 and 70 to fixedly connect the base plate 20, corner piece 22 and corner filler bracket 72.

As best seen in FIG. 17, a second rivet hole 76 is defined in bottom wall 58 of corner piece 22 and aligns with another rivet hole (not shown) in the base plate 20 for receipt of a second rivet to assure that the corner piece 22 is securely fastened by two rivets to base plate 20.

In the upper ends of the first and second duct abutment walls 60 and 62, there are angle shaped recesses 78 and 80, respectively. Recess 78 is defined by sloped walls 82 and 84. Recess 80 is defined by sloped walls 86 and 88. The recesses 78 and 80 are designed to receive spring metal clips 90, the details of which are shown in FIGS. 14-16.

As shown in FIG. 4, each of the corner pieces is supported by a threaded support leg 89 which is threadedly engaged with a threaded opening 91 (see FIG. 17) in the corner piece.

The details of the access unit 40 are best seen in the enlarged section view of FIG. 3.

Access unit 40 includes a generally rectangular access frame or access unit pan 92. A rectangular inner opening is defined through pan 92 along an innermost edge 94 of the angular cross-section member from which the pan 92 is formed. This rectangular inner opening defined by inner edge 94 defines the access opening 44 except for the notches in the corner thereof.

Pan 92 includes four pan adjustment screw brackets 93 which are welded or otherwise fixedly attached to the angle-shaped members of pan 92 and which protrude into the generally rectangular opening defined by pan 92 so as to define corner notches 102 in the access opening 44.

The pan 92 has four ears 96 extending outward at the corners thereof through which the screws 42 are placed. The screws 42 are received in screw holes 98 (see FIG. 17) in the corner pieces so that the pan 92 is directly connected to the corner pieces of the base 18.

A generally rectangular trim rail 98 is supported by the pan 92. Trim rail 98 is adjustably supported from pan 92 by four trim adjustment means 100 located at the four corners of the pan 92 for adjusting a height 101 of the trim rail 98 relative to the pan 92. A layer of porous foam gasket material 99 is glued to the outer wall of trim rail 98 and slides against the vertical wall of pan 92.

As best seen in FIG. 1, the trim adjustment means 100 project into the notch-shaped corner portions 102 of profile 44, as do the corner filler brackets 72.

Each of the four trim adjustment means 100 includes a threaded bolt 104 having an annular shoulder 106 defined above the threaded portion, and having a head 108. The bolt 100 is received in a threaded bore 110 of pan adjusting screw bracket 93.

A rail assembly adjustment bracket 112 has an opening 114 therein which is freely received about the bolt 104 and rests on the top of annular shoulder 106. There are four such brackets 112, one in each corner.

The previously mentioned square trim rail 98 is formed of four side rail pieces, the ends of which abut each other as indicated at 116 in FIG. 1. Thus, the ends of two of the side rail pieces of trim rail 98 rest upon each of the rail assembly adjustment brackets 112. A threaded screw 119 connects each side rail piece of trim rail 98 to the rail assembly adjustment bracket 112 at each corner.

Thus, to raise the trim rail 98 and thereby adjust the height 101 thereof above the pan 92 the bolts 104 are rotated thus raising the rail assembly adjustment brackets 112 and the trim rail 98.

A snap retainer ring 118 is disposed about each of the bolts 104 above its associated rail assembly adjustment bracket 112.

The trim rail 98 has a groove 117 defined therein within which is received a cover plate gasket 120.

In each corner, a tile trim spacer 122 lies freely on top of the trim rail 98 with an opening 124 freely received about the head 108 of bolt 104.

Finally, a square cover plate 126 fits relatively closely within the vertical walls of trim rail 98 and is attached to the trim rail 98 by four screws 128 (see FIG. 1) which thread downward into holes such as 130 (see lower right corner of FIG. 1) in the trim rail 98 to hold the cover plate 126 in place.

As is apparent in FIGS. 1 and 3, the cover plate 126 has four openings 132 defined therein through which the heads 108 of bolts 104 can be accessed to rotate the same and thus adjust the height of the trim rail 98 and cover 126 relative to the pan 92.

In FIG. 1, the cover plate 126 is partially cut away, as is a smaller portion of trim rail 98. Also the tile trim spacer 122 in the lower right corner has been removed so that other details located below it can be viewed.

The Extension Collar

The details of construction and the manner of use of the extension collar 48 can best be seen in FIGS. 4–6. As is apparent in FIG. 4, the extension collar 48 is sandwiched between the base 18 and the access unit 40 thus determining the nominal height 50 of the junction box apparatus 10.

The extension collar itself is shown in plan and elevation views in FIGS. 5 and 6, respectively. Extension collar 48 includes a generally vertically extending perimeter wall 134 including four sides 136, 138, 140 and 142. Extension collar 48 also includes upper and lower flanges 144 and 146 extending generally horizontally outward from each of the four sides of the perimeter wall 134. The lower flanges 146 rest upon the corner pieces 22, 24, 26 and 28 of base 18 thus defining an upper side of the side opening 30 and each of the duct openings formed therefrom such as duct openings 34 and 36 indicated in FIG. 4.

The extension collar 48 has a rectangular opening 148 defined inside of the perimeter wall 134 which is substantially coincident with and forms an extension of the access opening 44 defined through access unit 40 so that the tunnel insert 46 may pass through the extension collar 48.

In order to modify the nominal height 50 of the junction box 10, the basic assembly of FIG. 2 is disassembled by removing screws 42 so that access unit 40 can be lifted away from base 18. Then, an extension collar 48 of appropriate height is placed on top of the base 18. Then, the access unit 40 is placed on top of extension collar 48 with the pan 92 resting upon the upper flange 144 of extension collar 48. A bottom surface 150 (see FIG. 3) of pan 92 rests upon and is substantially coincident with the upper flange 144 of extension collar 48. Then, the short screws 42 are replaced with longer screws 152 which are tightened to snugly sandwich the extension collar 48 between the base 18 and the access unit 40. This provides positive electrical ground continuity between extension collar 48 and the base 18 and access unit 40.

The extension collar 48 is formed from a length of channel-shaped stock material. Three splits are placed in the upper and lower flanges 144 and 146 of the stock material coincident with the location of the corners of the extension collar 48. Then the web which forms the perimeter wall 134 is bent to form the corners, with the two free ends of the perimeter wall 134 being joined at the lower right corner of FIG. 5 by an angle shaped strap 154 which is welded to the sides 136 and 138 of perimeter wall 134.

By providing a plurality of different extension collars 48 of differing heights, a basic base assembly 18 and access unit 40 can be modified to be useful in several different depths of concrete flooring.

When the concrete floor 16 is poured, concrete flows into the channel shape of extension collar 48 between the upper and lower flanges 144 and 146 as seen in the righthand side of FIG. 4.

The Tunnel Insert

Figure 8:
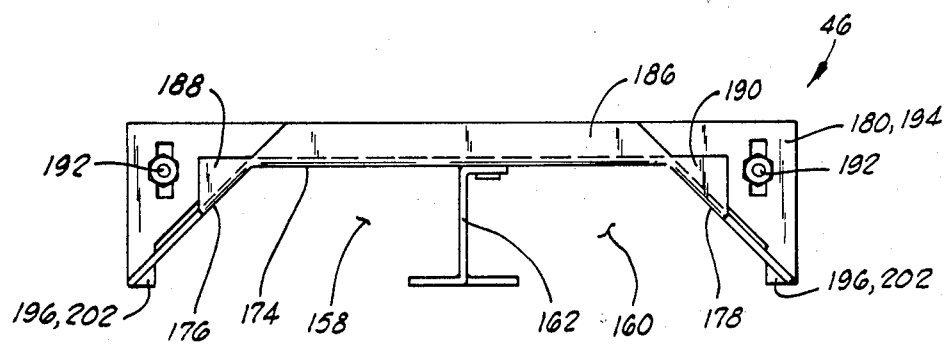
FIG. 8 is a front elevation view of the tunnel divider insert of FIG. 7.

The details of construction of the tunnel insert 46 are shown in FIGS. 7–9. The tunnel insert 46 is a removable means which is located in the interior 38 of base 18 for defining a plurality of passages communicating the various duct opening means of the base 18. The tunnel insert means 46 is constructed and dimensioned so that it can be inserted downward through the access opening shown in phantom lines as 44 in FIG. 1 after the base 18 and access means 40, and also the extension collar 48 if used, are connected together. The tunnel insert 46 can be inserted either before or after the concrete floor 16 is poured. As is apparent in FIG. 7, the tunnel insert 46 has a generally rectangular plan profile with notch means 156 in each corner thereof for clearing the four trim adjustment means 100 of the access unit 44 so that the tunnel insert 46 may pass downwardly through the access opening 44.

The particular tunnel insert means 46 illustrated in FIGS. 7–9 is constructed for either a single or dual service application of the junction box 10. That is, with the tunnel divider 46 either a single large duct may be connected to each side of the junction box 10, or two smaller ducts may be connected to each side of the junction box 10.

The tunnel insert 46 defines two parallel through passages 158 and 160 divided by a wall 162. The passages 158 and 160 extend in a first direction as indicated by arrow 163 from a side 164 to a side 166 of tunnel insert 46.

The tunnel insert 46 also defines two transverse take-off passages 168 and 170 extending in a second direction indicated by the arrow 172 perpendicular to the first direction 163. Passages 168 and 170 extend from side 169 to side 171 of tunnel insert 46.

The tunnel insert 46 has a cross-sectional shape, normal to the first direction 163, of an open bottom trapezoid having a top 174 and two tapered sides 176 and 178.

The divider wall 162 extends downward from the top 174 parallel to the first direction 163 to separate and partially define the through passages 158 and 160.

Tunnel insert 46 also includes a transverse wall 180 extending upward from the top 174 and the two tapered sides 176 and 178 parallel to said second direction 172 to thus separate and partially define the two transverse take-off passages 168 and 170.

Two openings 182 and 184 are defined through the top 174 to communicate the through passages 158 and 160 with the transverse take-off passages 168 and 170, respectively.

Although not illustrated in the drawings, a grommeting material is preferably provided along the inner edge of openings 182 and 184 to provide a smooth wire pulling surface.

At the sides 164 and 166 of tunnel insert 46, there are upwardly extending flanges 186 and 188, respectively, the shape of which is best seen in FIG. 8. These flanges extend upward either adjacent the inner edge 94 (see FIG. 3) of pan 92, in the instance where no extension collar 48 is utilized, or adjacent the inside of sides 136 and 140, respectively, of perimeter wall 134 when the extension collar 48 is utilized.

Additionally, adjacent each side 164 and 166 of tunnel insert 44 there also are two corner shaped tabs 188 and 190 which as seen in FIG. 4 close a space which would otherwise be present adjacent the duct openings 34 and 36.

As best seen in FIGS. 7 and 9, the transverse wall 180 is formed of two members 194 and 196 joined together by nut and bolt assemblies 192.

As seen in FIG. 7, the wall member 194 has a horizontal flange 198 thereon attached to the top 174 by rivets 200. As best seen in FIGS. 8 and 9, the wall member 196 has vertically extending legs 202 received in notches such as 204 in the tapered sides 176 and 178.

For a larger junction box 10, for example one having sides of sufficient width to accommodate three of the narrower 3⅛ inch wide ducts with one-inch duct separator springs 32 placed therebetween, the tunnel insert 46 would be similarly constructed except that it would have two of the divider walls 162 thus creating three of the through passages such as 158 and 160, and it would have two of the divider walls such as 180 thus creating three of the transverse take-off passages like 168 and 170. There similarly would be a third opening like openings 182 and 184 so that each of the through passages would be communicated with one of the transverse take-off passages.

It will also be apparent that with such a larger junction box capable of receiving three separate smaller ducts on each side, the box could be assembled for use with only two services, with one service using a smaller 3⅛ inch wide duct and the second service using a larger 7¼ inch wide duct with a one-inch duct separator spring 32 being located between the two ducts. Also, a single 11⅜ inch wide multi-service duct could be used.

It will be apparent that with even larger sizes of the junction box such as those capable of accommodating four or five of the smaller 3⅛ inch wide ducts on each side, several different combinations and arrangements of ducts could be provided for.

Spring Clips And Duct Separator Springs

As is best appreciated in viewing FIG. 4, each of the ducts that is inserted into one of the duct openings such as 34 or 36 is received between one of the spring metal clips 90 attached to one of the corner pieces and one of the duct separator springs 32. If no duct separator spring 32 is utilized, a larger size duct could be received simply between the two spring metal clips 90 attached to two adjacent corner pieces such as 28 and 22.

Also, in a larger junction box utilizing more than one duct separator spring 32 on a side of a junction box, a given duct could be received between two adjacent duct separator springs 32.

Each of the spring metal clips 90 and duct separator springs 32 can be generally described as a duct retainer and grounding means 90 or 32 attached to the base 18 adjacent one of the duct openings for resiliently gripping and simultaneously grounding the ducts to the base 18 as the ducts are inserted into one of the duct openings.

The duct separator spring 32 is best shown in FIGS. 10 and 11, with an enlarged lower portion thereof being shown in FIGS. 12 and 13. Separator spring 32 is formed from a thin sheet of spring steel.

Duct separator spring 32 is detachably attached to the base plate 20 of base 18 by a lower clip structure 206. It is the lower clip structure 206 which is shown in enlarged view in FIGS. 12 and 13.

The lower clip structure 206 has upper and lower generally horizontal flanges 208 and 210 which are slightly spaced apart and which are joined by a web portion 212. The lower flange 210 includes upturned tabs 214 which engage the separator attachment hole 54 (see FIG. 1) in base plate 20 to hold the duct separator spring 32 in place relative to base plate 20 such as is illustrated in FIG. 4. The separator spring 32 can be manually inserted in the base 18 and manually removed therefrom without the need for any special tools.

As best seen in FIG. 10, the duct separator spring 32 includes a vertical middle web 216 having two oppositely facing spring metal clips 218 and 220 each including a serrated edge 222 and 224, respectively, for gripping one of the ducts and making electrical grounding contact therewith.

The duct separator spring 32 also includes stop shoulders 226 and 228 located inward of each of the spring metal clips 218 and 220, respectively, for abutting an end of one of the ducts when the duct is inserted into the duct opening means such as 34 or 36.

Turning now to FIGS. 14–16, the details of construction of the spring metal clips 90 associated with the corner pieces will be described.

Each of the spring metal clips 90 includes first and second flanges 230 and 232 joined by a web 234. The flange 230 has a tab 236 extending out of the plane thereof for engagement with a hole 238 or 240 (see FIGS. 18 and 19) associated with one of the recesses 78 or 80, respectively, defined in the corner piece. It is noted that the holes 238 and 240 can also receive conventional grounding screws (not shown) in place of clips 90.

The clips 90 slide into place over one of the sloped walls such as 82 or 86 seen in FIG. 17 with the tab 236 engaging the hole 238 or 240.

Each corner piece such as corner piece 22 includes two stop shoulders 244 and 246 located inward of the spring metal clips 90 for abutting the ends of the ducts engaged by the spring metal clips 90.

The duct stops 226 and 228 on spring separator 32 and the duct stops 244 and 246 on the corner pieces permit a smooth wire pulling radius for wires exiting the ducts associated therewith.

The flange 232 which faces away from the corner piece as best seen in FIG. 4, extends into one of the duct receiving openings 34 or 36 and has a angle portion 241 with a serrated edge 242 thereon for making positive electrical grounding contact with one of the ducts.

Thus, when a duct is inserted in one of the duct receiving openings such as 34 of FIG. 4, the duct is resiliently gripped between one of the spring metal clips 90 and the spring metal clip 218 of separator spring 32, with the serrated cutting edges 242 and 222 thereof cutting or biting into the outer surface of the duct to automatically make positive electrical grounding contact between the duct and the separator spring and thus with the base 18.

It is noted that the duct retainer and grounding means 32 and 90 could be used with accessory structures other than junction boxes. For example, they could be adapted for use with duct supports, duct coupler supports, or the like. Also, if the duct opening of the accessory structure and the duct are appropriately sized, a single serrated spring metal clip extending into the duct opening could successfully function as a duct retainer and grounding means.

Thus it is seen that the apparatus and methods of the present invention readily achieve the ends and advantages mentioned as well as those inherent therein. While certain preferred embodiments of the invention have been illustrated for purposes of the present disclosure, numerous changes in the arrangement and construction of parts and steps may be made by those skilled in the art, which changes are encompassed within the scope and spirit of the present invention as defined by the appended claims.

What is claimed is:

1. A junction box apparatus for an electrical raceway system to be placed in a floor, comprising:
   a base having a plurality of duct opening means disposed therethrough for receiving a plurality of ducts with said ducts communicating with an interior of said base;
   an access means, located above and connected to said base, for permitting access downward into said interior of said base, said access means having an access opening defined therethrough; and
   a removable tunnel insert means, located in said interior of said base, for defining a plurality of passages communicating said plurality of duct opening means, said tunnel insert means being so constructed and dimensioned that it can be inserted downward through said access opening into place within said interior of said base after said base and said access means are connected together.

2. The apparatus of claim 1, further comprising:
   a removable extension collar means, adapted to be sandwiched between said base and said access means, for determining a nominal height of said junction box apparatus;
   removable duct separator means, adapted to be connected to said base, for separating a plurality of said ducts received in said duct opening means; and
   whereby by means of said removable tunnel insert means, said removable extension collar means, and said removable duct separator means, said base and access means can be readily modified to be compatible with a plurality of duct combinations and arrangements and a plurality of floor thicknesses.

3. The apparatus of claim 1, wherein:
   said access means includes:
   a generally rectangular access frame, said access opening being also generally rectangular and defined by said access frame, said access frame being connected to said base;
   a generally rectangular trim rail supported by said access frame; and
   four trim adjustment means, located at four corners of said access frame and projecting into said generally rectangular access opening, for adjusting a height of said trim rail relative to said access frame; and said tunnel insert means has a generally rectangular plan profile with notch means in each corner thereof for clearing said four trim adjustment means so that said tunnel insert means may pass through said access opening.

4. The apparatus of claim 3, wherein:
   said tunnel insert means defines a plurality of parallel through passages extending in a first direction and an equal plurality of transverse take-off passages extending in a second direction perpendicular to said first direction, said tunnel insert means having:
   a cross-sectional shape, normal to said first direction, of an open-bottomed trapezoid having a top and two tapered sides;
   one or more divider walls extending downward from said top of said trapezoid parallel to said first direction to define said plurality of parallel through passages;
   one or more transverse walls extending upward from said top and said two tapered sides parallel to said second direction to define said plurality of transverse take-off passages; and
   a plurality of openings defined through said top to communicate each of said through passages with a corresponding one of said take-off passages.

5. The apparatus of claim 1, wherein:
   said tunnel insert means defines a plurality of parallel through passages extending in a first direction and an equal plurality of transverse take-off passages extending in a second direction perpendicular to said first direction, said tunnel insert means having:
   a cross-sectional shape, normal to said first direction, of an open-bottomed trapezoid having a top and two tapered sides;
   one or more divider walls extending downward from said top of said trapezoid parallel to said first direction to define said plurality of parallel through passages;
   one or more transverse walls extending upward from said top and said two tapered sides parallel to said second direction to define said plurality of transverse take-off passages; and
   a plurality of openings defined through said top to communicate each of said through passages with a corresponding one of said take-off passages.

6. The apparatus of claim 1, further comprising:
   a removable extension collar means, adapted to be sandwiched between said base and said access means, for determining a nominal height of said junction box apparatus, said extension collar means having a rectangular opening defined therethrough substantially coincident with and forming an extension of said access opening so that said tunnel insert means may pass through said extension collar means.

7. The apparatus of claim 6, wherein:
   said extension collar means includes a generally vertically extending perimeter wall with upper and lower flanges extending generally horizontally outward from said perimeter wall, said lower flange resting on said base and defining an upper side of said duct opening means.

8. The apparatus of claim 1, further comprising:
   duct retainer and grounding means, attached to said base adjacent each of said duct opening means, for resiliently gripping and simultaneously grounding said ducts to said base as said ducts are inserted into said duct opening means.

9. The apparatus of claim 8, wherein:
   said duct retainer and grounding means includes at least one duct separator spring detachably attached to said base and having two oppositely facing spring metal clips extending into two of said duct opening means, said spring metal clips each including a serrated edge means for gripping one of said ducts and making electrical grounding contact therewith.

10. The apparatus of claim 8, wherein:
said duct retainer and grounding means includes at least two spring metal clips located on opposite sides of each of said duct opening means, each of said spring metal clips including a serrated edge means for making electrical grounding contact with one of said ducts.

11. The apparatus of claim 1, wherein:
said base includes a rectangular base plate and four separate corner pieces attached to said base plate and extending upward therefrom, said duct opening means being located between said corner pieces; and
said access means is detachably connected directly to said four corner pieces.

12. A junction box apparatus for an electrical raceway system to be placed in a floor, comprising:
a base having a plurality of duct opening means disposed there through for receiving a plurality of ducts with said ducts communicating with an interior of said base, said base including a rectangular base plate and four corner pieces attached to said base plate and extending upward therefrom;
an access means, detachably connected to said base, for permitting access downward into said interior of said base, said access means being detachably connected directly to said four corner pieces; and
a removable extension collar means, sandwiched between said base and said access means, for determining a nominal height of said junction box apparatus, whereby said nominal height may be adjusted by detaching said access means from said base and inserting said extension collar means of appropriate height, said extension collar means resting upon said four corner pieces.

13. An accessory structure apparatus for an electrical raceway system to be placed in a floor, comprising:
a base having at least one duct opening means disposed therethrough for receiving at least one duct; and
duct retainer and grounding means, attached to said base adjacent said duct opening means for resiliently gripping and simultaneously grounding said duct to said base as said duct is inserted into said duct opening means.

14. The apparatus of claim 13, wherein:
said duct retainer and grounding means includes at least one serrated spring metal clip associated with said duct opening means.

15. The apparatus of claim 13, wherein:
said duct retainer and grounding means includes at least two spring metal clips located on opposite sides of said duct opening means for gripping said duct therebetween, each of said spring metal clips including a serrated edge means for biting into said duct and making positive electrical grounding contact therewith.

16. The apparatus of claim 13, wherein:
said base is a junction box base which is generally rectangular in plan and has four side openings, one in each side of said base; and
said duct retainer and grounding means includes duct spacer means detachably connected to said base and vertically spanning at least one of said side openings to divide said side opening into a plurality of said duct opening means.

17. The apparatus of claim 16, wherein:
said duct spacer means includes at least one separator spring having two oppositely facing spring metal clips extending into two of said duct opening means, said spring metal clips each including a serrated edge means for biting into one of said ducts and making positive electrical grounding contact therewith.

18. The apparatus of claim 17, wherein:
said separator spring includes stop shoulders, located inward of each of said spring metal clips, for abutting ends of said ducts when said ducts are inserted into said duct opening means.

19. The apparatus of claim 13, wherein:
said base is a junction box base which is generally rectangular in shape and includes a rectangular base plate and four corner pieces attached to said base plate and extending upward therefrom defining four side openings, one in each side of said base between two of said corner pieces; and
said duct retainer and grounding means includes two spring metal clips attached to each of said corner pieces and extending into the two side openings associated with each corner piece, said spring metal clips each including a serrated edge means for making positive electrical grounding contact with one of said ducts.

20. The apparatus of claim 19, wherein:
each of said corner pieces includes two stop shoulders located inward of said two separate spring metal clips, for abutting ends of said ducts engaged by said spring metal clips.

21. A method of assembling a junction box of an electrical raceway system to be placed in a floor, comprising:
providing a base and a detachable access unit, said base having a plurality of duct openings defined therein communicating with an interior of said base, and said access unit being located above and connected to said base and having an access opening defined therethrough communicating with said interior; and
inserting a removable tunnel insert downward through said access opening into said interior of said base and thereby defining a plurality of passages within said interior communicating said plurality of duct openings.

22. The method of claim 21, further comprising:
attaching a removable duct separator to said base and thereby partially defining two adjacent ones of said duct openings corresponding to two of said passages.

23. The method of claim 21, further comprising:
disconnecting said base and said access unit;
placing an extension collar between said base and said access unit, said extension collar having an opening therethrough coincident with and forming an extension of said access opening; and
reconnecting said base and said access unit with said extension collar sandwiched therebetween, thereby modifying a nominal height of said junction box.

24. The method of claim 21, further comprising:
providing at least two serrated spring metal clips attached to said base on opposite sides of each of said duct openings, said duct openings coinciding with ends of said passages defined by said tunnel insert; and inserting a duct into each of said duct openings thereby:
- resiliently gripping said duct between two of said spring metal clips; and
- simultaneously electrically grounding said duct to said base due to engagement of serrated teeth of said clips with said duct.

25. The method of claim 21, further comprising a step of:
- pouring concrete around said junction box to form a concrete floor; and
- wherein said step of inserting said tunnel insert is performed after said step of pouring concrete.

26. A method of assembling a duct with an accessory structure of an electrical raceway system to be placed in a floor, comprising:
- providing said accessory structure having a duct opening defined therein;
- providing at least one serrated spring metal clip attached to said accessory structure adjacent and projecting into said duct opening; and
- inserting a duct into said duct opening, thereby:
  - resiliently gripping said duct with said spring metal clip; and
  - simultaneously electrically grounding said duct to said accessory structure due to engagement of serrated teeth of said clip with said duct.

* * * * *